Dec. 20, 1949 M. A. JORDAN 2,491,813
GYROSCOPE
Filed April 20, 1946
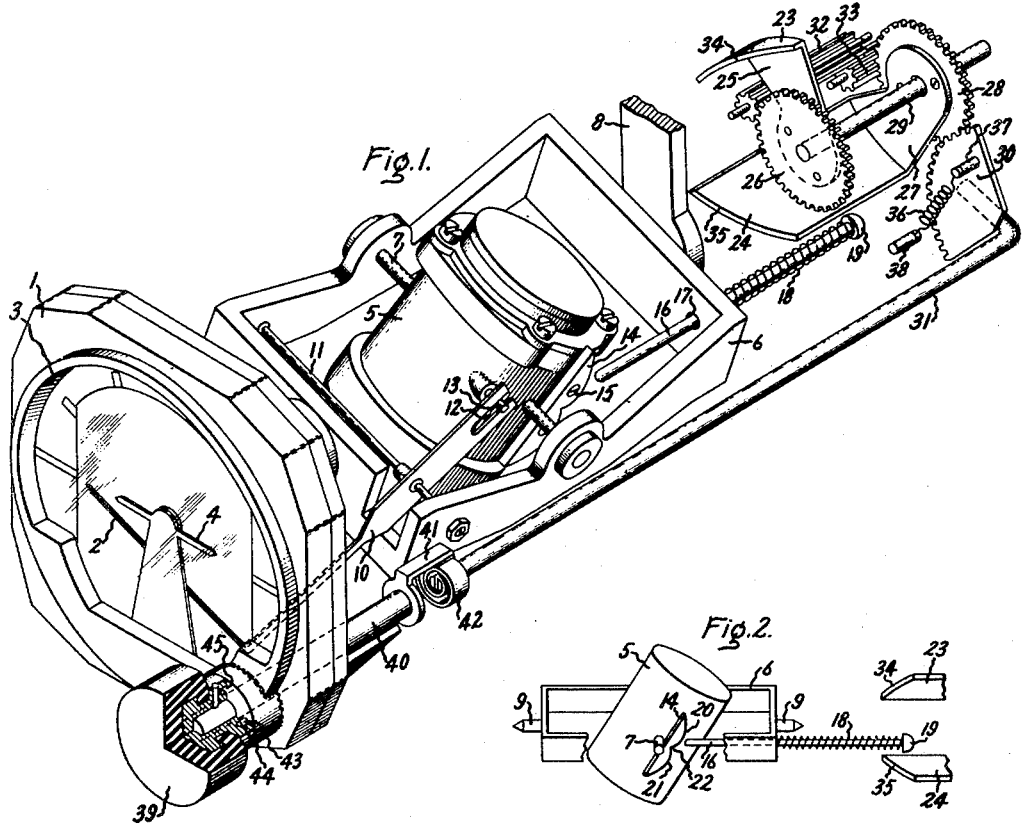
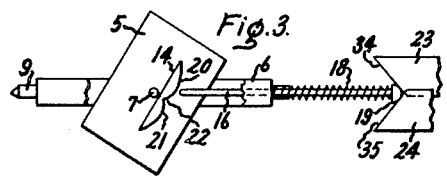
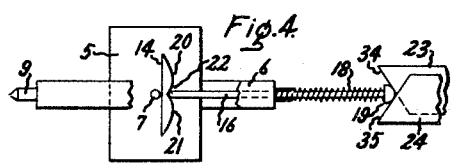
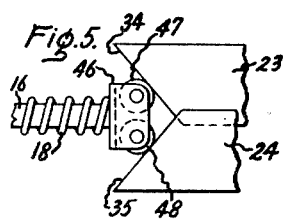
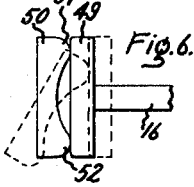
Inventor:
Matthew A. Jordan,
by
His Attorney.

Patented Dec. 20, 1949

2,491,813

UNITED STATES PATENT OFFICE 2,491,813

GYROSCOPE

Matthew A. Jordan, Saugus, Mass., assignor to General Electric Company, a corporation of New York Application April 20, 1946, Serial No. 663,699

7 Claims. (Cl. 74—5.1)

This invention relates to gyroscopes and more particularly to the caging mechanism used to centralize the gyroscope relative to its support.

Gyroscopes, particularly those used in aircraft attitude indicating instruments, are usually provided with a caging mechanism used to centralize the gyroscope to a reference or datum position prior to use. Aircraft gyroscopic instruments are also frequently caged to prevent damage to the instrument during violent maneuvers of the aircraft which might otherwise be caused by impact of the gyroscope against its stops.

The space available on an aircraft instrument panel for mounting instruments is cramped and recently such effort has been spent in trying to reduce the size, and particularly the diameter of aircraft gyroscope instruments to a point where they can be inserted in a standard panel opening used for many other types of instruments.

One of the principal difficulties in this problem of size reduction lies in the design of the caging mechanism because in designs used heretofore space had to be provided on the diameter of the instrument for the caging device since it involved mechanism revolving around the gyroscope and its support gimbal. The caging mechanism was therefore the limiting factor in reducing the diameter of the instrument casing.

An object of the present invention is to provide a new and improved caging mechanism for a gyroscope.

Another object is to provide a caging mechanism for an aircraft instrument gyroscope which does not require space on the diameter of the instrument, thereby permitting a reduction in the maximum diameter of the instrument casing.

A further object is to provide a caging mechanism which is relatively simple and inexpensive to build.

A still further object is to provide a caging mechanism in which lower bending stresses are encountered on the parts used to force the gyroscope to the centralized or caged position.

Further objects and advantages of my invention will become apparent as the following description proceeds and the features of novelty which characterize my invention will be pointed out with particularity in the claims annexed to and forming a part of this specification.

For a better understanding of my invention reference may be had to the following detailed specification taken in connection with the accompanying drawing in which:

Fig. 1 is a perspective view of a gyroscopic attitude-indicating instrument embodying a caging mechanism forming the subject matter of the present invention, Fig. 2 is a diagrammatic view showing the caging mechanism in a retracted position, Fig. 3 shows the gyroscope in a partly caged position with the gimbal centralized, Fig. 4 shows the gyroscope completely caged with both the rotor bearing frame and the gimbal centralized, Fig. 5 shows a modified arrangement of the caging pin, and Fig. 6 shows a different caging pin and cooperating cam.

Referring to Fig. 1 of the drawing, I have chosen to illustrate my invention in connection with an aircraft gyroscopic instrument known as an artificial horizon. Such instruments are used to indicate the pitch and bank attitudes of an aircraft. The instrument comprises a face plate 1 which is adapted to be mounted on an aircraft instrument panel so as to permit the pilot to observe the movements of a horizon bar 2 through an opening 3 in the face of the instrument. The pilot determines the pitch attitude of the aircraft by the vertical position of the horizon bar 2 relative to a miniature reference airplane 4 and he determines the bank attitude of the aircraft by the angular position of the horizon bar relative to the miniature airplane.

The horizon bar 2 is actuated by a gyroscope comprising a rotor bearing frame 5, which houses a rotor (not shown) having a spin axis which is normally approximately vertical. The bearing frame also houses a suitable driving motor, also not shown, which may be either electric or pneumatic.

For the purpose of providing universal movement of the gyroscope there is provided a gimbal 6 on which the bearing frame 5 is pivotally mounted by means of trunnions 7. The gimbal 6 is pivotally mounted on the frame 8 of the instrument by means of trunnions 9. The axes defined by the trunnions 7 and 9 are mutually perpendicular and they intersect the rotor spin axis of the center of suspension of the gyroscope. The instrument is mounted so that the axis defined by trunnions 7 extends in a transverse direction of the aircraft and the axis defined by trunnions 9 extends in the direction of the longitudinal axis of the aircraft.

In order to keep the spin axis in the approximately vertical position during operation of the gyroscope there is usually provided an erecting device, not shown, which may, for example, be an eddy current type similar to that shown in Patent 2,360,339 granted October 17, 1944, on application of A. Hansen, Jr., and assigned to the assignee of the present invention.

The horizon bar 2 is attached to a rearwardly extending lever 10, an intermediate portion of which is rotatably mounted on a transversely extending pivot rod 11 carried on the gimbal 6. The rear end of the lever has a slot 12 in which rides a transversely extending pin 13 carried by the rotor bearing frame 5. Pitch movements of the aircraft about the axis of trunnions 7 cause vertical movement of the pin 13 relative to the gimbal 6 and this action tilts lever 10 to provide the pitch-indicating vertical movement of the horizon bar 2. Since the lever 10 is carried by gimbal 6 and therefore stabilized by the gyroscope, banking movements of the aircraft and the face plate 1 about the axis of trunnions 9 cause angular movements of horizon bar relative to the miniature airplane 4 to give bank indication.

As illustrated in Fig. 1, the movable parts of the instrument are shown in a position such as they might occupy when the gyroscope is inactive or when the gyroscope has for some reason tumbled as sometimes occurs when the limits of the instrument are exceeded during violent maneuvers of the aircraft. Thus it will be noted that the bearing frame is tilted to the rear and the gimbal 6 is tilted to the right. This causes the horizon bar 2 to tilt to the right and to be below the miniature airplane 4 as shown. When the gyroscope is running and the erecting device is active, the gyroscope will be slowly precessed to the reference position in which the bearing frame 5 and the spin axis of the rotor are approximately vertical and the gimbal 6 is approximately horizontal. The erecting action is, however, necessarily slow and to avoid the inconvenience of having to wait for this action to occur, it is customary to provide a caging mechanism for mechanically forcing the gyroscope to the reference or datum position in which the bearing frame 5 and the gimbal 6 are centralized and in which the horizon bar 2 lies in registration with the miniature airplane 4.

The present invention relates to a new and improved mechanism for accomplishing this caging or centralizing action, which mechanism will now be described.

The caging mechanism of the present invention acts to centralize the gyroscope in two sequential steps. In the first step of the caging action the gimbal 6 is centered relative to its support 8 and in the second step the bearing frame 5 is centered with respect to the gimbal.

Considering first the mechanism for centering the bearing frame relative to the gimbal, there is provided a heart cam 14 which is rigidly secured to frame 5 by means of screws, one of which is shown at 15. The cam 14 is adapted to be engaged by the inner end of a sliding pin 16 which is carried by a gimbal 6 and which extends through a hole 17 in the rearward side of the gimbal. The pin 16 is normally maintained in the retracted position shown in Fig. 1 by a compression spring 18 which extends between an enlarged head 19 on the outer end of the pin and the rear surface of the gimbal. When the pin 16 is pushed inwardly the inner end engages either of the outwardly flaring cam surfaces 20 or 21 of the heart cam 14 depending on the direction of tilt of bearing frame 5. Further inward movement of the pin 16 forces the bearing frame to the center upright position in which the pin is seated in the cam notch or recess 22.

Considering now the mechanism for centering the gimbal with respect to its support 8, it will be noted that the pin 16 extends horizontally in a direction which is substantially parallel to but is laterally displaced from the pivot axis of the gimbal defined by the trunnions 9. Leveling or centering of the gimbal is accomplished by mechanism for vertically positioning the pin and thereby rocking the gimbal to a center position.

The vertical positioning and sliding of pin 16 is accomplished by a mechanism comprising two rotatable jaws 23 and 24. The jaw 23 has an arm 25 which is secured to the web portion of a gear 26. Similarly the jaw 24 has an arm 27 which is secured to the web portion of a gear 28. Gears 26 and 28 are supported on a shaft 29 but are loosely mounted thereon so that they are free to turn in opposite directions. Gear 28 meshes with a gear sector 30 which is connected to and rotated by a shaft 31. When shaft 31 is rotated clockwise gear 28 and jaw 24 are rotated counterclockwise. Simultaneously jaw 23 and gear 26 are rotated clockwise by the action of two intermeshing, motion-reversing pinions 32 and 33 arranged so that the pinion 32 meshes with gear 26 and pinion 33 meshes with gear 28.

The jaws 23 and 24 are provided with cam surfaces 34 and 35 which are so shaped that when the jaw 23 is rotated clockwise and the jaw 24 is rotated counterclockwise, the cam surfaces first engage and center the head 19 of pin 16 and then push the pin inwardly by a scissors-like action. The jaws 23 and 24 are normally held in a retracted position shown in Fig. 1 by means of a tension spring 36 which extends between a pin 37 on gear sector 30 and a stationary pin 38. The spring 36 tends to rotate the shaft 31 and gear sector 30 to the counterclockwise uncaged position.

The caging mechanism is operated by means of a control knob 39 which is located on the front of face plate 1 and which is connected to the outer end of a rotatable shaft 40. The shaft 40 extends through the face plate and the inner end of the shaft carries a crank arm or dog 41. The shafts 31 and 40 are connected together through a spiral spring 42 the inner end of which is secured to the forward end of shaft 31, the outer end of the spring being coupled to dog 41.

In order to provide means for locking the caging mechanism in both the locked and unlocked positions, there is provided a stationary pin 43. The pin extends into a complementary hole 44 in knob 39 in the uncaged position and extends into another hole 45 in the knob when the knob is in the caged position. The spiral spring 42 permits the shaft 40 and the knob 39 to be pulled outwardly to disengage the pin 43 from the holes 44 and 45 prior to a rotative movement of the knob in either a caging or uncaging direction.

The operation is as follows:

It is assumed that the parts are in the position shown in Figs. 1 and 2 and that it is desired to cage the gyroscope. Knob 39 is first pulled outwardly to disengage pin 43 from hole 44 and thereby unlock the caging mechanism. As the knob 39 is rotated clockwise, the jaw 23 is rotated clockwise causing the cam surface 34 to descend over head 19 and jaw 24 is rotated clockwise causing cam surface 35 to ascend under head 19.

Since the gimbal 6 is tilted clockwise from the center position, the lower cam surface 35 will first engage the under side of head 19 of pin 16. Gyro torque resists movement of gimbal 6 about the fore and aft axis until the bearing frame 5 precesses to its stop position. The assembly then loses its stability permitting movement about the fore and aft axis until the upper cam surface 34 is engaged by head 19. The reverse action then takes place until finally the gimbal 6 is centered with the head 19 engaged by both of the cam surfaces 34 and 35 as shown in Fig. 3.

After the gimbal has been centered, continued clockwise rotation of knob 39 causes the jaws 23 and 24 to close with a scissors-like action forcing head 19 and pin 16 to the left and causing the inner end of the pin to engage cam surface 20 of heart cam 14. Continued inward movement of pin 16 pivots the bearing frame 5 counterclockwise to the vertical position shown in Fig. 4, in which position the pin is received in cam notch or recess 22. If the bearing frame 5 had been initially tipped in a counterclockwise direction from the center position, the pin would have engaged cam surface 21 causing the bearing frame to pivot clockwise to the center position.

The mechanism is designed so that when the jaws 23 and 24 reach the position of Fig. 4, the hole 45 in knob 39 lies opposite pin 43 so that the knob can be pushed inwardly to enable the pin to enter the hole 45 and thereby lock the mechanism in the caged position.

When it is desired to uncage the gyroscope, the knob 39 is pulled outwardly and rotated counterclockwise, the action being the reverse of that above described.

The return spring 36 insures that the jaws 23 and 24 will return to the retracted position in which the gyroscope is free to operate normally even though the pilot may inadvertently fail to return the knob 39 to the uncaged position after temporary caging.

In the modification shown in Fig. 5, the head 19 of the pin 16 is replaced by a U-shaped bracket 46 which carries rollers 47 and 48 adapted to engage respectively the cam surfaces 34 and 35. This arrangement reduces friction and consequently the force required to rotate the knob 39 in a caging direction.

The heart cam 14 may be replaced by other suitable cams or motion producing arrangements. In Fig. 6, there is shown a modified arrangement in which the inner end of pin 16 carries an abutment 49 and the heart cam 14 is replaced by a saddle-shaped cam 50. When the caging mechanism is in the position corresponding to Fig. 3, the abutment 49 and the cam 50 occupy the positions shown by the dotted lines in Fig. 6. When the caging operation is completed the abutment 49 is forced into engagement with upper and lower lobes 51 and 52 of cam 50 this positively locking the bearing frame in the center position. This type of cam has a more positive locking action but its range of effective operation is not as great as that of the heart cam 14.

It is to be particularly noted that the caging arrangement constructed in accordance with my invention does not require the use of caging jaws or other apparatus moving around the outside of the gyro bearing frame 5 and gimbal 6. Since the jaws 23 and 24 are located in back of the gimbal, their radius of swing can be reduced to a point where the diameter of the instrument casing needs to be only large enough to provide clearance for the gimbal and bearing frame. My invention therefore permits a very considerable reduction in the diameter of the instrument casing which is advantageous for the reasons pointed out above.

The sequential caging action obtained by my invention in which the gimbal is first centered relative to its support and the bearing frame subsequently centered relative to the gimbal, results in a reduction in the stresses applied to the caging mechanism in overcoming the gyroscope inertia. The reason for this is the fact that the pin 16 may be made as large as necessary to reduce the stresses in the pin to a safe value. In previous arrangements the horizon bar operating pin, such as pin 13, has been used for caging and this pin had to be small to obtain minimum friction and therefore the bending stresses were high. This is not true in the present arrangement because the pins 13 and 16 are entirely separate and the pin 13 is not involved in the caging action.

The arrangement of my invention has the additional advantage that it is relatively simple to construct and does not require the use of accurately cut ring gears previously used.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A caging mechanism for a gyroscope having a rotor bearing frame pivotally mounted in a supporting gimbal, the gimbal being pivotally mounted so as to permit universal movement of said bearing frame, said mechanism comprising a cam mounted on said bearing frame, a normally retracted pin slidably mounted on said gimbal and arranged to engage said cam and centralize said bearing frame relative to said gimbal when the pin is actuated to an extended position, a pair of movable jaws arranged to be moved from a retracted position to a position in which they first engage said pin from opposite directions and thereby centralize said gimbal relative to its support, said jaws being so shaped that upon a continued scissors-like closing movement said pin is forced into engagement with said cam to centralize said bearing frame relative to said gimbal, and a caging control member for actuating said movable jaws.

2. In combination a gyroscope comprising a rotor bearing frame and a gimbal, said bearing frame being pivoted in said gimbal for movement about a first gyroscope axis and said gimbal being pivoted on a support for movement about a second gyroscope axis and caging mechanism for causing a pivoted movement of said bearing frame about said axes to a centralized position, said mechanism comprising a cam mounted on said bearing frame, an axially slidable pin mounted on said gimbal and adapted to be moved so that one end of said pin engages said cam to pivot said frame about said first axis to a center position, a pair of jaws arranged to be moved to a position in which said jaws engage said pin from opposite directions and thereby pivot said gimbal about said second axis to a center position, said jaws being shaped to cause an axial caging movement of said pin by a scissors-like action after said jaws have initially positioned said pin.

3. In combination, a gyroscope having a gimbal pivotally mounted on a support and a rotor bearing frame pivotally mounted on said gimbal, a cam mounted on said bearing frame, a pin mounted on said gimbal so as to be axially movable relative to said gimbal into engagement with said cam to centrally position said bearing frame relative to said gimbal, the path of movement of said pin being substantially parallel to but spaced from the pivotal axis of said gimbal, means for biasing said pin to a retracted inactive position, and caging means comprising a pair of rotatable jaws having cam surfaces biased to a retracted position and adapted when rotated from said retracted position to first engage said pin on opposite sides to position said pin so as to centralize said gimbal relative to its support, and subsequently to move said pin axially by a scissors-like action into engagement with said cam to centralize said bearing frame relative to said gimbal.

4. In combination, a gyroscope having a gimbal pivotally mounted on a support and a rotor bearing frame pivotally mounted on said gimbal, a cam mounted on said bearing frame, a pin mounted on said gimbal so as to be axially movable relative to said gimbal into engagement with said cam to centrally position said bearing frame relative to said gimbal, the path of movement of said pin being substantially parallel to but spaced from the pivotal axis of said gimbal, means for biasing said pin to a retracted inactive position, and caging means comprising a pair of rotatable jaws having cam surfaces adapted when rotated from a retracted position to first engage said pin on opposite sides to position said pin so as to centralize said gimbal relative to its support, and subsequently to move said pin axially by a scissors-like action into engagement with said cam to centralize said bearing frame relative to said gimbal, and a caging knob connected to rotate said jaws.

5. In combination, a gyroscope having a gimbal pivotally mounted on a support and a rotor bearing frame pivotally mounted on said gimbal, a cam mounted on said bearing frame, a pin mounted on said gimbal so as to be axially movable relative to said gimbal into engagement with said cam to centrally position said bearing frame relative to said gimbal, the path of movement of said pin being substantially parallel to but spaced from the pivotal axis of said gimbal, means for biasing said pin to a retracted inactive position, and caging means comprising a pair of rotatable jaws having cam surfaces adapted when rotated from a retracted position to first engage said pin on opposite sides to position said pin so as to centralize said gimbal relative to its support, and subsequently to move said pin axially by a scissors-like action into engagement with said cam to centralize said bearing frame relative to said gimbal, and means for locking said caging means in both the retracted and caged positions.

6. A caging mechanism for a gyroscope having a rotor bearing frame pivotally mounted in a supporting gimbal, said gimbal being pivotally mounted to permit universal movement of said bearing frame, said mechanism comprising a cam mounted on said bearing frame and having cam surfaces symmetrically flaring outwardly from a recessed portion, a pin slidably mounted on said gimbal to engage said cam surfaces and rotate said cam and frame until said pin seats in said recessed portion when said pin is actuated to an extended position, spring means for biasing said pin to a retracted position, a caging control member, and means responsive to a movement of said control member for forcing said pin into engagement with said cam.

7. In combination, a gyroscope having a gimbal mounted on a support to pivot about a first axis and a rotor bearing frame mounted on said gimbal to pivot about a second axis, a cam mounted on said bearing frame and having cam surfaces symmetrically flaring outwardly from a recessed portion, a pin slidably mounted on said gimbal to engage said cam surfaces and rotate said cam and frame about said second axis until said pin seats in said recessed portion when said pin is actuated to an extended position, means for biasing said pin to a retracted position, caging jaws which may be actuated to engage and rotate said pin to a predetermined position about said first axis, said jaws having cam surfaces thereon which force said pin to an extended position upon further actuation of said jaws, and means for actuating said caging jaws.

MATTHEW A. JORDAN.

REFERENCES CITED

The following references are of record in the file of this patent:

UNITED STATES PATENTS

| Number | Name | Date |
|---|---|---|
| 2,207,850 | Brandt | July 16, 1940 |
| 2,350,769 | Kimball | June 6, 1944 |
| 2,468,016 | Konet | Apr. 19, 1949 |